(12) United States Patent
Badenell

(10) Patent No.: US 8,046,814 B1
(45) Date of Patent: Oct. 25, 2011

(54) SYSTEMS AND METHODS FOR FORMULATING AND DELIVERING VIDEO HAVING PERISHABLE INFORMATION

(75) Inventor: Jon E. Badenell, Marietta, GA (US)

(73) Assignee: The Weather Channel, Inc., Atlanta, GA (US)

( * ) Notice: Subject to any disclaimer, the term of this patent is extended or adjusted under 35 U.S.C. 154(b) by 1240 days.

(21) Appl. No.: 10/690,936

(22) Filed: Oct. 22, 2003

(51) Int. Cl.
*H04N 7/173* (2011.01)

(52) U.S. Cl. .................................................. 725/114

(58) Field of Classification Search .............. 725/32, 725/34–36, 93, 116, 146, 105; 715/500.1; 702/3

See application file for complete search history.

(56) References Cited

U.S. PATENT DOCUMENTS

| | | | |
|---|---|---|---|
| 5,654,886 A * | 8/1997 | Zereski et al. ................ 702/3 |
| 5,781,227 A | 7/1998 | Goode et al. | |
| 5,907,321 A | 5/1999 | Grossman et al. | |
| 5,952,943 A * | 9/1999 | Walsh et al. ............. 341/50 |
| 6,029,045 A | 2/2000 | Picco et al. | |
| 6,278,717 B1 | 8/2001 | Arsenault et al. | |
| 6,310,661 B1 | 10/2001 | Arsenault | |
| 6,463,585 B1 | 10/2002 | Hendricks et al. | |
| 6,505,123 B1 * | 1/2003 | Root et al. ................ 702/3 |
| 6,744,922 B1 * | 6/2004 | Walker ..................... 382/190 |
| 6,961,061 B1 * | 11/2005 | Johnson et al. ............ 345/473 |
| 2002/0016963 A1 * | 2/2002 | Inoue et al. ............... 725/39 |
| 2004/0010372 A1 * | 1/2004 | Schwoegler ............... 702/3 |
| 2004/0030550 A1 * | 2/2004 | Liu et al. ................. 704/231 |
| 2004/0120018 A1 * | 6/2004 | Hu ........................ 358/506 |
| 2005/0071886 A1 * | 3/2005 | Deshpande ............... 725/135 |
| 2006/0209090 A1 * | 9/2006 | Kelly et al. .............. 345/632 |

OTHER PUBLICATIONS

"Video Segmantation with the Assistance of Audio Content Analysis" IEEE, pp. 1507-1510.*

* cited by examiner

*Primary Examiner* — Brian Pendleton
*Assistant Examiner* — Nnenna Ekpo
(74) *Attorney, Agent, or Firm* — McKeon, Meunier, Carlin & Curfman, LLC

(57) ABSTRACT

A system and method for dynamically formulating and delivering a video program that includes perishable information is provided. The system includes a video server that creates a video program using one or more recent video segments in combination with other video segments. The recent video segments are typically generated in a studio, whereas the other video segments are obtained from a variety of sources, including databases and live feeds. An audio system stores pre-recorded audio and is used to create audio for certain video segments. The video server enables an organization to deliver more customized video programs to more users and to update those video programs more frequently without requiring additional studio time or resources.

21 Claims, 6 Drawing Sheets

SYSTEMS AND METHODS FOR FORMULATING AND DELIVERING VIDEO HAVING PERISHABLE INFORMATION

FIELD OF THE INVENTION

The present invention relates to systems and methods for formulating and delivering video having perishable information and, more particularly, to systems and methods for formulating a simulated real-time video broadcast and for delivering the video over a network.

BACKGROUND

People constantly seek and rely upon information that is perishable by nature. Perhaps the most universal and oldest type of perishable data is weather information. Weather information is perishable since the weather conditions or even forecasts are highly dependent upon time. Because weather conditions can change abruptly without warning, people cannot rely upon stale weather information but instead must obtain current, fresh, or real-time weather information if they want to receive accurate information on the weather. Other types of perishable information include financial news, such as stock prices, and sports information, such as scores of games.

People can receive perishable information from more than one source. For centuries, the newspaper has been a mechanism by which people can receive important and timely news. Because of the need to print and physically distribute the newspaper, the newspaper is often at best a daily paper and mainly contains information of events that occurred during the previous day. In other words, depending the frequency of the newspaper, the newspaper has certain lag time in the news which means that the news has aged at least slightly. Radio and television are relatively more recent innovations and can deliver information closer to real-time. The Internet is perhaps the most recent network through which people can receive perishable information.

Between all of these methods of receiving information, the television is the preferred way of receiving news and other perishable information for many people. The television is preferred partly because it is highly passive activity that delivers the greatest amount of information. As opposed to much of the information on the Internet and within a newspaper, a consumer of information delivered through television can simply listen and watch a news program and other than listening and watching the consumer need not perform any other activity, such as reading or clicking through web pages. Television also offers both audio and video and therefore provides a greater amount of information in a comparable amount of time than someone can obtain from reading a newspaper, listening to the radio, or reading text from a web page.

Because many people prefer receiving their perishable information through television, people have come to expect the perishable information to be formatted in certain ways. For example, most television viewers are able to watch a local news program which has news on local events, local weather information, local sports scores, and other such localized information. Viewers also expect to be able to receive some type of national news program, such as those offered on the main networks. For weather information, viewers expect to receive local weather conditions and forecasts not only through the local news program, but also through other sources, predominately The Weather Channel®. The Weather Channel® provides national weather information to all viewers as well as local weather forecasts for a multitude of cities and regions across the country, as well as cities and regions throughout the world. In summary, viewers expect to be able to receive local video programs that contain local perishable information.

As bandwidth increases for Internet users, the Internet is able to deliver a greater amount of perishable information to consumers and deliver that information in multiple formats. In addition to text and images, a small but growing segment of information that is delivered over the Internet is in video format. In this manner, Internet users are able to watch video over the Internet and receive perishable information in a manner that approximates the way information is delivered through television. Because of expectations established through television the delivery of perishable information through the Internet preferably mirrors that of conventional television programming.

Because the Internet has such a wide reach across the world, delivering national and local perishable information to each locality is simply not feasible. Even within the United States, an inordinate amount of resources would be needed to provide video over the Internet which has local content specific for each city or region. The time within a studio is an extremely valuable resource. Any organization necessarily has a limited number of studios and time during which filming can be performed. In addition to the physical limitations, every organization also has a limited number of On-Camera Personnel (OCP). For instance, for an evening news program, a television network would only have a handful of qualified anchors for delivering the news. Also, for weather forecasts, a provider of weather information would have a relatively small number of On-Camera Meteorologists (OCM). Based on the available resources, the provider of perishable information can deliver only a maximum amount of video programs having localized perishable information for delivery to consumers. For example, The Weather Channel® spends approximately 4 hours each day within its several studios to formulate local forecast videos for a subset of its cities and regions. In addition to the costs associated with the studios and OCP, technology in the form of cameras, editors, and web servers forms another significant cost in providing video to consumers over the Internet.

Due to constraints on resources, consumers are not able to receive video programs that are specific to each city or region within the country, let alone for other countries. With regard to weather information, consumers are not able to download from the Internet a video program containing the local forecast for every city or region currently served by The Weather Channel®. While consumers can download a web page from the Internet from weather.com which shows local conditions and forecasts, the consumer cannot receive a corresponding video program from the Internet for every city or region. These same shortcomings are also associated with other types of perishable information, such as financial or sports news.

SUMMARY

The present invention overcomes the problems described above by providing a system and method for dynamically formulating and delivering a video program that includes perishable information. The system includes one or more studios for generating recent video segments, as well as one or more databases that store video and/or audio segments. In addition, the system includes an audio system which contains audio recordings of many commonly used words, phrases, or sentences. The system receives data feeds that provide real-time data and current video segments. The system includes a video server which creates a video program based upon combinations of the video segments from the studios, data feeds, video feeds, information in the audio system, and data stored in the various databases. The video server provides the video program on-the-fly and/or stores the video program or portions of the video program in a database for delivery at a later time.

The video server performs a method that includes obtaining recent video segments. Each recent video segment can be received in real-time, such as through streaming media, or may be stored prior to being sent to the video server. In addition, the video server obtains current data, receives secondary video segments and/or retrieves video segments. The current data includes text, images, files, audio files, and other data that does not take the form of a complete video segment. The secondary video segments include video segments from third parties, such as those providing advertisements, or affiliates, such as a local news station. Based on the information received, the video server generates one or more portions of the video program and couples these portions with the recent video segment to generate the complete video program. The method used by the video server enables an organization to deliver more customized video programs to more users and to update those video programs more frequently without requiring additional studio time or resources.

The video server includes multiple decoders and supports multiple video formats. The decoders receive input video, such as a Digital Video file and/or an MPEG2 file and decode the files to produce decoded video segments. The video server also includes multiple converters or "Screenies." Screenies receive data and/or imagery and create a video segment from the data or imagery. The Screenies convert the input data and/or imagery into video segments that conform to a predetermined format. The video server creates a video program by populating a linear frame buffer with the video segments produced by the encoders and/or Screenies. The audio for the video program is assembled in a similar manner as the video. The Screenies typically produce only video content so the audio for the video segments created by the Screenies is obtained from the audio system or from another source of audio. As used herein the term "linear frame buffer" includes a sequential series of video frames and associated synchronized audio tracks. Once a sufficient amount of information is buffered in the linear frame buffer, the information is encoded using an appropriate encoding scheme by an encoder. The video server includes multiple encoders that support multiple video formats.

A script controls the creation of a video program by the video server. The script is created by the video server in response to receiving a request from an end user device. The request includes a number of parameters that define the video program. For example, the request specifies an encoding scheme, a video screen size and a transition bit rate. In addition, the request includes a geographic identifier, such as a DMA (Designated Market Area), that identifies the location of the device associated with the request.

These and other aspects, features and advantages of the present invention may be more clearly understood and appreciated from a review of the following detailed description of the disclosed embodiments and by reference to the appended drawings and claims.

BRIEF DESCRIPTION OF THE DRAWINGS

The accompanying drawings, which are incorporated in and form a part of the specification, illustrate preferred embodiments of the present invention and, together with the description, disclose the principles of the invention. In the drawings.

DETAILED DESCRIPTION

Figure 1:
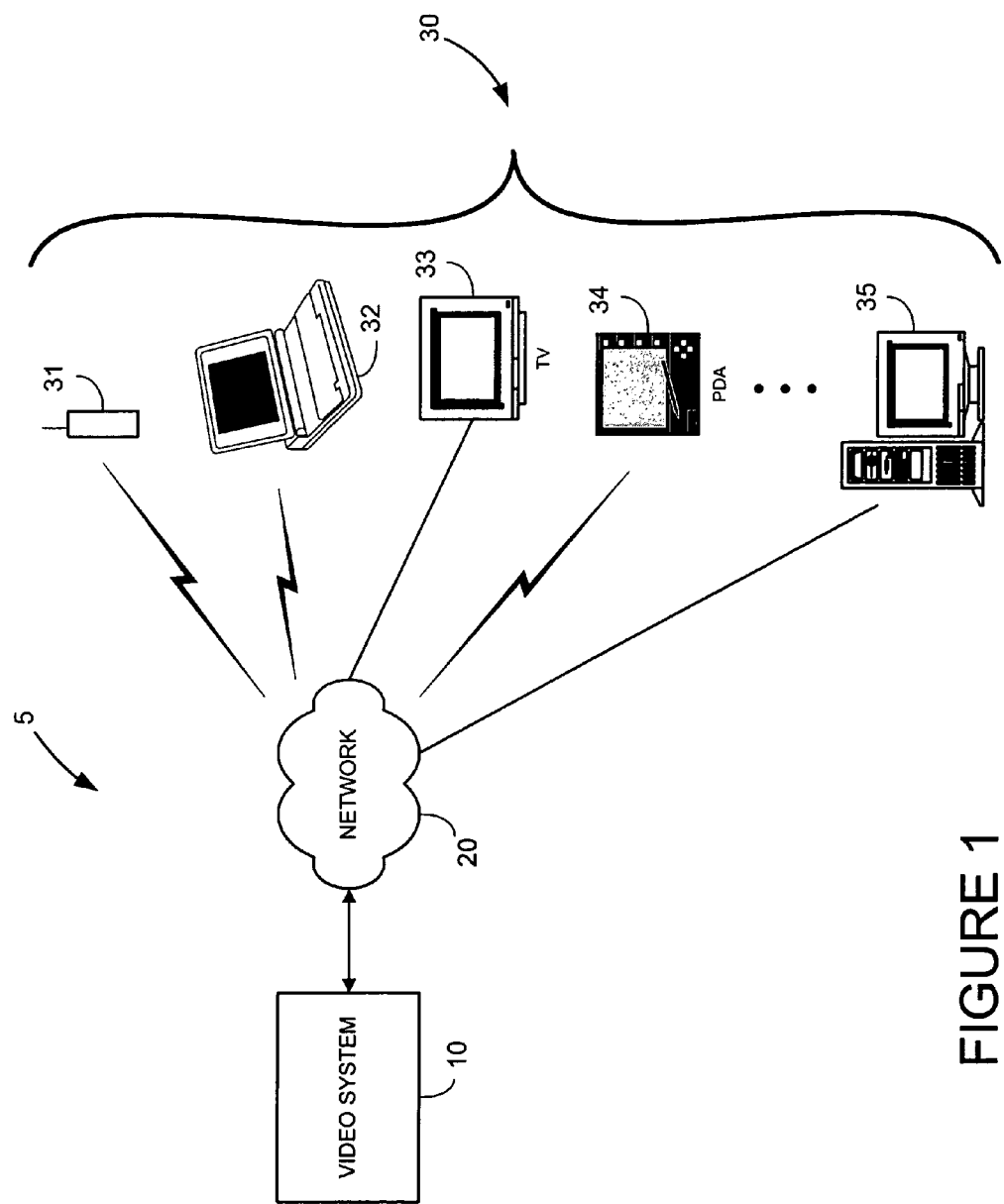
FIG. 1 is a block diagram of a network including a video system, in accordance with an embodiment of the invention.

Reference will now be made in detail to preferred embodiments of the invention, non-limiting examples of which are illustrated in the accompanying drawings.
Video System A network 5 for formulating and delivering weather information according to a preferred embodiment of the invention is shown in FIG. 1. With reference to FIG. 1, the network 5 includes a video system 10 for formulating videos, a network 20 for delivering the videos, and one or more devices, collectively 30, for receiving the videos. As will be described in greater detail below, the video system 10 generates videos that contain perishable information. The video system 10 joins multiple video segments together to generate a video program that is delivered through the network 20 to the devices 30. These video segments preferably include at least one video segment that is recently generated and one or more video segments that are derived on-the-fly and/or from segments stored in memory.

For the purposes of this description, the perishable information will be weather information, such as weather conditions, weather forecasts, and/or other weather-related information. Non-limiting examples of weather-related information include planning information based on weather conditions or forecasts and advertisements that are associated with weather conditions or forecasts. While the perishable information comprises weather information in the preferred embodiment of the invention, the perishable information may comprise other types of information, such as financial information, sports information, and other types of news. The financial information includes real-time quotes of trading prices for stock, bonds, and other financial instruments, indicators of the performance of companies or groups of companies, indicators of the performance of one or more economies or segments of an economy, and other financial information that may be of interest and which inherently is perishable. The sports information may include current scores of games or other types of matches that are currently being played, scores of games or matches that have been completed, standings or rankings, status of votes on players or teams, such as for a most-valuable player, and other sports related information that is perishable.

The network 20 can be any network capable of transmitting and delivering video between the video system 10 and the devices 30. Preferably, the network 20 includes the Internet.

The network 20 may include other or additional types of networks, such as the Public Switched Telephone Network (PSTN), frame relay networks, ATM networks, other types of packet switched networks, Intranets, satellite systems, mobile radiotelephone networks, paging networks, wireless data networks, Local Area Networks (LANs), and Wide Area Networks (WANs). Some examples of wireless data networks include Cellular Digital Packet Data (CDPD), any other packet digital or analog networks, circuit-switched digital or analog data networks, wireless ATM or frame relay networks, EDGE, CDMA1, and Generalized Packet Radio Service (GPRS). Other examples of networks include TDMA, CDMA, WAP, AMPS, PCS, GSM, NAMPS, USDC, CDPD, IS-95, GSC, Pocsag, FLEX, DCS-1900, PACS, MIRS, e-TACS, NMT, C-450, ERMES, CD2, DECT, DCS-1800, JTACS, PDC, NTT, NTACS, NEC, PHS, and satellite systems.

The devices 30 may comprise any type of device including mobile devices and devices that are typically stationary during use. The mobile devices include, but are not limited to, mobile radiotelephones 31, portable computing devices 32, pagers, personal data assistants (PDAs) 34, as well as devices developed in the future and other devices that are apparent to those skilled in the art upon reading this description. The stationary devices include TV products 33, such as digital, interactive, enhanced televisions, digital video recorders, TiVo, and WebTV, and computers 35.

Figure 2:
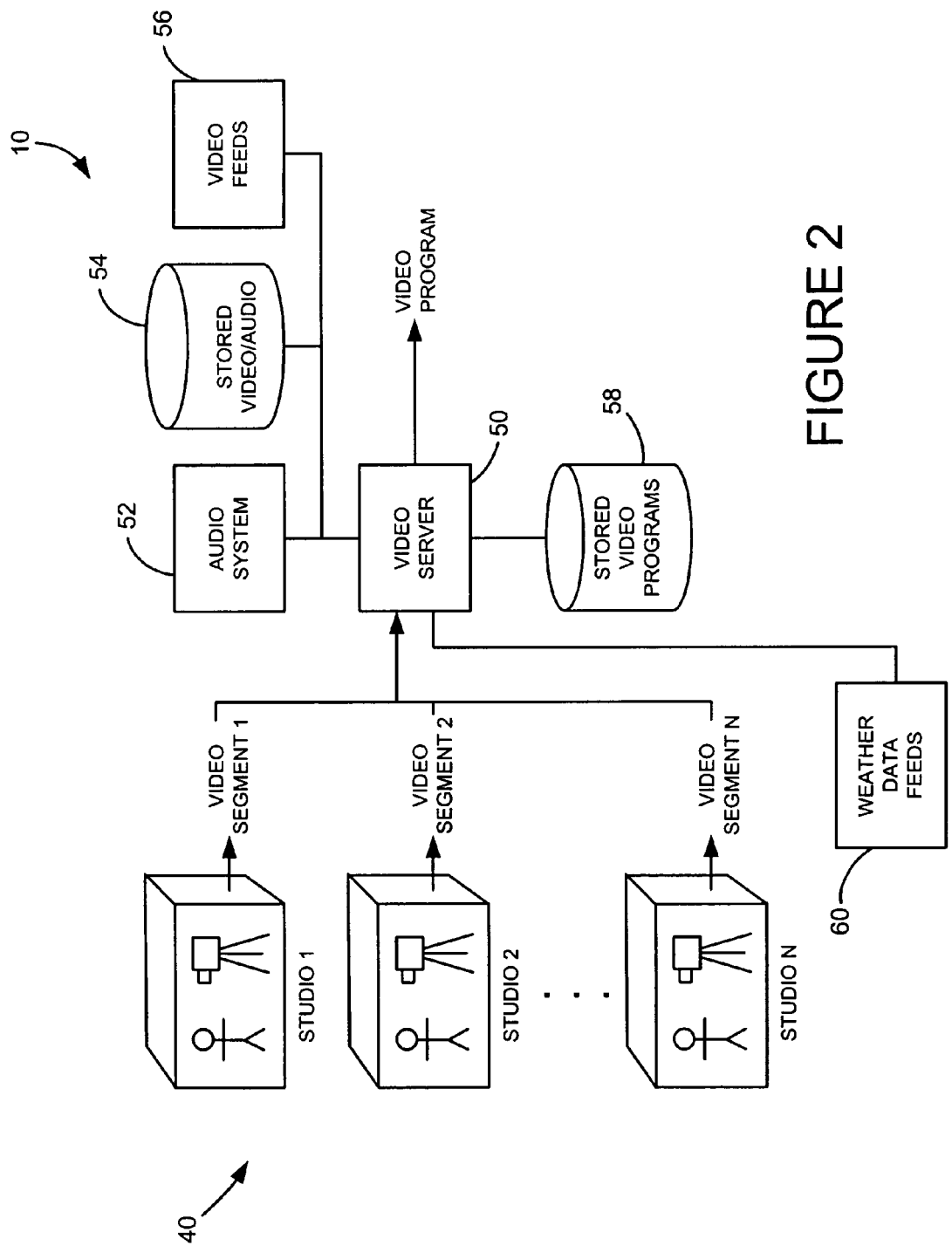
FIG. 2 is a more detailed block diagram of the video system of FIG. 1.

FIG. 2 shows a more detailed diagram of the video system 10. The video system 10 includes one or more studios 40 for generating video segments. For instance, in this example, the video system 10 includes studio 1, studio 2, and additional studios up until studio N for producing a video segment 1, video segment 2, and additional video segments up until video segment N. These video segments 1 to N are recently generated video segments as opposed to those that may be prerecorded or otherwise stored in a database. These video segments 1 to N are provided to a video server 50.

The video server 50 also receives weather data feeds 60 with these weather data feeds providing real-time weather data. The video server 50 may also receive current video segments from video feeds 56 and has access to video and/or audio segments that are stored in database 54. Furthermore, the video server 50 has access to an audio system 52 which contains audio recordings of many commonly used words, phrases, or sentences. The video server 50 produces a video program based upon combinations of video segments from the studios 40, weather data feeds 60, video feeds 56, information in the audio system 52, and data stored in database 54. The video server 50 provides the video program on-the-fly and/or stores the video program or segments of the video program in database 58 for delivery at a later time.

The studios 40 are preferably within a single organization and, more particularly, within a single facility. For instance, the studios may comprise several studios available within The Weather Channel® facility. The studios 40, however, may be dispersed throughout different organizations and at remote locations relative to each other. The studios 40 provide a recent video segment which may be used by the video server 50 in formulating a video program. In the preferred embodiment, the studios 40 obtain video segments in which On-Camera Meteorologists (OCM) participate in delivering timely weather information as part of the video program. For example, the OCMs may provide a video segment that serves as an introduction and greeting from the OCM to a particular city or region. It should be understood that the number of studios 40 and the corresponding number of On-Camera Personnel (OCP) can be increased in order to provide a greater number of video programs for consumers. The OCP in the preferred embodiment is an OCM but in other embodiments may be a news broadcaster, sports show host, or other types of personnel who are involved in the formation or delivery of perishable information.

The weather data feeds 60 may comprise data feeds from any suitable source. For instance, the information may be derived from the National Weather Service, the National Center for Environmental Predictions, The Weather Channel, Intellicast, NOAA, Fleet weather, Weather Labs, Inc., Accu-Weather, Weather Concepts, or any third party value added supplier. Furthermore, the weather information that is provided to the devices 30 may comprise any weather-related information. Weather information includes current conditions, sea and surf conditions, ski conditions, pollen, air quality, ultraviolet (UV) or other indices, trip or travel planning, traffic conditions, airport delays, school closings or delays, daily forecasts, hourly forecasts, narrative forecasts, seasonal outlooks, weather warnings and watches, satellite imagery, radar imagery, forecast weather shields, forecast precipitation, and lifestyle alerts, such as warnings to gardeners about frost conditions, conditions on the skies for pilots, or road conditions for drivers. Thus, the weather information is not limited to any precise type of data but instead may relate, for example, to current or forecasted conditions, land, sea, or air-related weather information, textual and/or graphical representations of weather information, audio or video information, manipulations of weather data, such as heat or other indices, as well as recommendations or advisory information related to the weather, such as advice for farmers, gardeners, commercial entities such as utilities. The weather related information might pertain to any activity, such as holidays, travel, driving, outdoors, home and garden, health, participatory sports such as skiing, golfing, softball, soccer and spectator sporting events, or school day activities. Weather related information may also pertain to personal planning, such as advice as to what clothes to wear, whether to bring an umbrella, whether to put chains on the car tires, etc. Other examples of weather information will be apparent to those skilled in the art and are encompassed by the invention.

The audio system 52 is a system that stores audio of the OCP saying commonly used words, phrases, and/or sentences. For example, with weather information, the audio system 52 contains recordings of OCMs saying many commonly used forecasts or expressions of local weather conditions, such as those relating to temperature, wind conditions, cloud conditions, etc. The audio system 52 preferably contains recordings for each of the OCM for as many of the words, phrases, and sentences as is practically possible.

Method for Creating Video Programs

Figure 3:
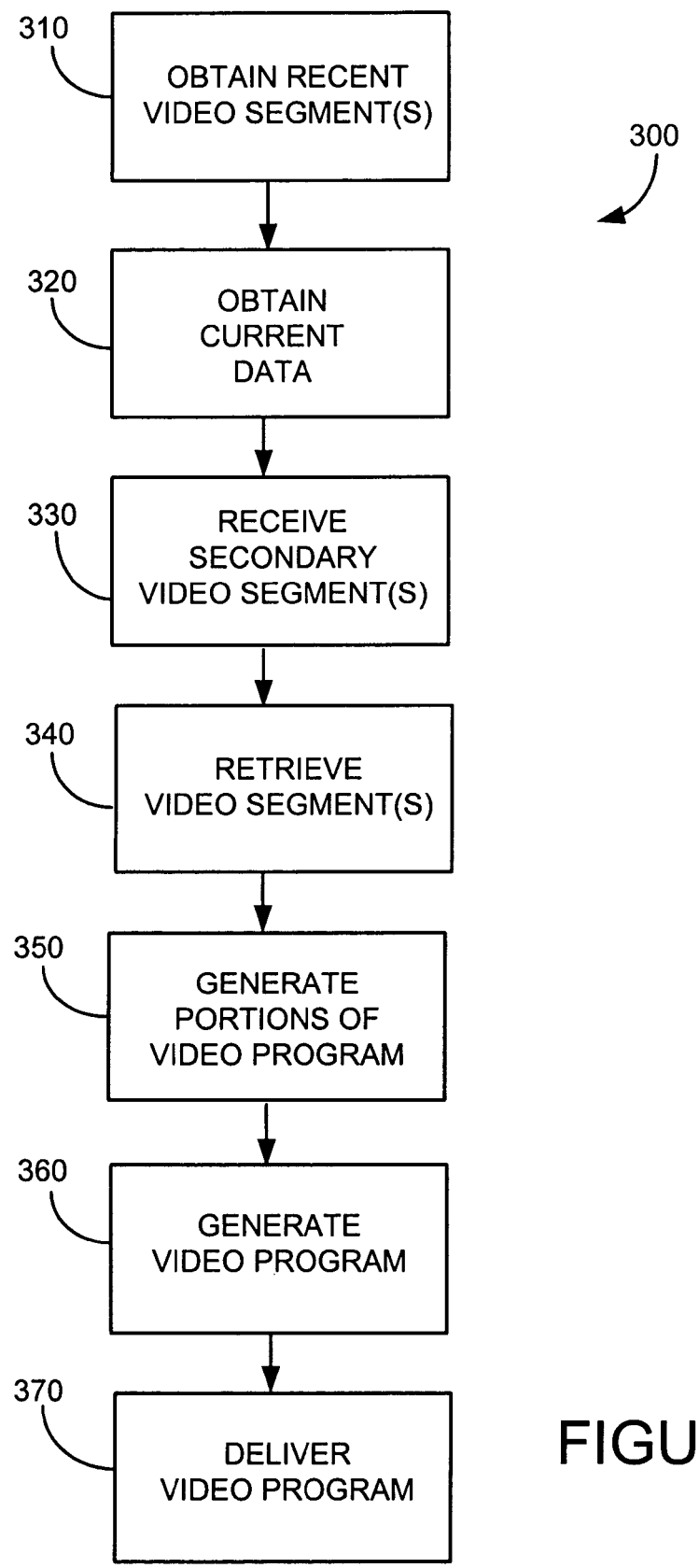
FIG. 3 is a flow chart illustrating an exemplary method by which a video server assembles a video program.

FIG. 3 is a flow chart illustrating a method of operation 300 for the video server 50 for generating a video program from at least one current video segment. At 310, the video server 50 obtains recent video segment(s). Each recent video segment can be received in real-time, such as through streaming media, or may be stored prior to being sent to the video server 50. The video server 50 generates the final video program from the recent video segment and at least one additional piece of data. For example, the video server 50 may obtain current data at 320, receive secondary video segment(s) at 330, or retrieve video segment(s) at 340. The current data at 320 includes text, images, files, audio files, and other data that does not take the form of a complete video segment. The secondary video segments received at 330 include video segments from third parties, such as those providing advertisements, or affiliates, such as a local news station. The video segments retrieved at 340 are video segments that have already been stored and are not recent. As mentioned above, the video server 50 may receive some or all of this information at 320 through 340. Based on the information received, the video server 50 generates one or more portions of the video program at 350 and couples these portions with the recent video segment to generate the complete video program at 360. The video server 50 delivers the video program at 370.

As mentioned above, the video server 50 may generate video programs and store them in memory, may generate the video programs on-the-fly by assembling the various pieces of information, or may do a mixture of both storing portions of the video program in advance and generating other portions of the video program on-the-fly. The extent to which the video server 50 stores portions in memory versus generates the video program on-the-fly is a trade-off between processing power versus memory. For some applications of the video server 50, the need and desire to generate video programs on-the-fly, such as in response to consumer requests, may outweigh the benefit of storing the video programs or portions of the video programs in advance of a request.

For the preferred embodiment, the video server 50 generates a video program that contains current weather data. Current weather data includes current weather conditions, current weather forecasts, and weather reports, such as those warning of adverse weather conditions. The extent to which current means instantaneously and in real-time, of course, depends upon the frequency by which the data is updated. The current weather conditions are those detected by sensing equipment and, with the exception of some latency in transmission, are essentially real-time weather conditions. The current weather forecasts are updated frequently throughout the day, such as at intervals of 10 to 15 minutes. Typically, the current weather reports are not issued at any prescribed interval but instead are sporadically issued based on the weather conditions. The weather reports usually have some inherent time period during which they are valid. For example, a tornado warning may be in effect for a particular geographic area only during the period of time when the tornado may hit that area. For non-weather applications, the current data may include sports scores, sports results, prices, interest rates, news or any other type of perishable data.

The recent video segment received at 310 is one that is periodically updated at a frequency dictated by the available resources. As mentioned above, the video server 50 combines the recent video segment with other data and/or video segments to generate the video program. As will be more apparent from the description below, the video server 50 is able to generate new video programs over a period of time which are updated with current data. Each of the video programs, however, is not separately produced, such as in a studio, but instead is assembled from various pieces of information.

An explanation of the preferred types of video programs should illustrate the benefits of the invention. Internet users are limited in the types of timely weather programming they can retrieve over the Internet. For local forecasts, one web site may be able to provide video programming with local weather data only for major cities and regions. Even for these limited number of cities and regions, the local forecasts may be provided only once at the beginning of the day and may not be updated throughout the day. As explained in the Background section, as a practical matter, an organization does not have the resources to generate video programs with local weather data for each city and region and certainly cannot update the video programs throughout the day for each city and region.

The video server 50 can address these limitations by enabling an organization to deliver video programs for more cities and regions and to update those video programs throughout the day. In one example, the recent video segment is filmed in the studio 40 and includes a video of the OCM greeting the viewers. For one OCM, the video server 50 may receive a group of video segments with each video segment having a greeting for a different city or region. Furthermore, for each OCM, the video server 50 may receive a group of video segments with each video segment associated with a different period of time throughout the day, such as a morning, afternoon, and evening greeting. At the very least, the video server 50 receives a recent video segment that can be used for a new day and which may be useful for a plurality of cities, regions, or even countries. The video server 50 does not receive the entire video program from the recent video segment using one OCM.

The video server 50 generates additional video segments based on a variety of data. In this example, the video server 50 derives weather maps and other images and then retrieves the associated audio data from the audio system 52 for that same OCM. Preferably, the audio system includes audio that corresponds to all possible pieces and values of a weather forecast pre-recorded by all of the OCMs. For example, each OCM records audio describing conditions, such as sunny, cloudy, partly cloudy, chance of rain, chance of snow, clearing, etc. To create a local weather forecast, the forecast is broken into pieces and each piece is assigned a unique key. The video server matches each piece of the forecast with the appropriate pre-recorded audio based on the conditions relevant to the local weather forecast. Typically, the audio system provides the appropriate audio for the OCM that provided the greeting. By combining the visual data with the audio data from the audio system 52, the video server 50 generates a video segment featuring an OCM even though that OCM was not involved in creating that video segment. While the OCM was involved in the initial creation of the audio system 52, once that database has been populated, an innumerable number of different video segments can be created by combining the audio with corresponding visual data.

In this example, the video server 50 may retrieve other video segments at 340, such as advertisements, video feed from an OCM who is on the scene during adverse weather conditions, video segments highlighting the provider of the weather information, etc. In the preferred embodiment, the advertisements are selected based on current weather data as described in co-pending patent application Ser. No. 09/707,335, entitled "Targeted Weather Information Delivery Systems and Methods," filed on Nov. 6, 2000, the disclosure of which is incorporated herein by reference.

For the purposes of this description, a video segment refers to a part of the entire video program. When two or more video segments are combined and the resultant combination is not the final video program, then the combination of those video segments is referred to as a portion of the video program. The resultant end product of combining the recent video segment with other video segments and/or portions of the video program is the video program. Thus, the video program is the finished product that is delivered to the consumer.

As can be appreciated, the method 300 of generating video programs can greatly reduce the amount of resources devoted to the generation of a corresponding number of video programs. Stated differently, the method 300 of the invention can enable an organization to generate substantially more video programs with the same amount of time devoted to the studio. This advantage is of immense benefit to an organization such as The Weather Channel since the OCMs need not be burdened with trying to record video programs for every city and region. Instead, the same number of OCMs can produce video segments, as opposed to entire video programs, for a larger number of cities and regions in the same amount of studio time. These video segments can then be combined with other video segments to form video programs for each city and region.

Another benefit of the method 300 is that the consumer can enjoy a greater number of video programs. In the example of delivering weather data, consumers in some cities or regions are presently unable to receive video programs containing forecasts for their cities or regions.

Video Server

Figure 4:
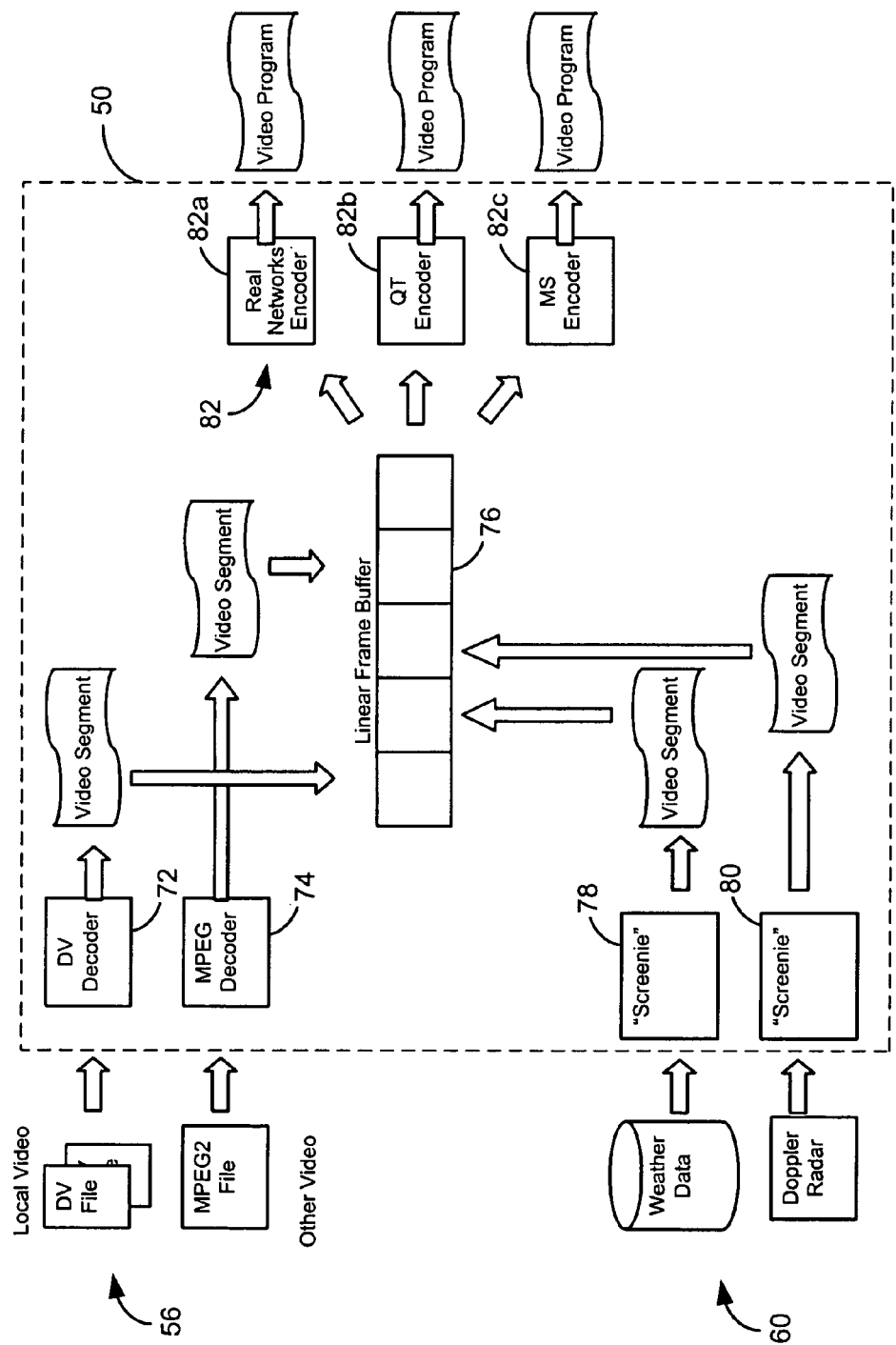
FIG. 4 is a block diagram of an exemplary video server.

FIG. 4 illustrates the various functional blocks of the video server 50 that are used to create a video program. The video server includes multiple decoders and supports multiple video formats. The exemplary decoders illustrated in FIG. 4 include a DV (Digital Video) decoder and an MPEG (Moving Pictures Expert Group) decoder. However, as will be apparent to those skilled in the art, additional and/or alternative decoders can be included in the video server. The decoders receive input video, such as the DV file and the MPEG2 file illustrated in FIG. 4, and decode the files to produce decoded video segments. The content of the input video corresponds to the recent video segments, secondary video segments and/or video segments described above in connection with FIG. 3.

The video server also includes multiple converters or "Screenies" 78, 80. Screenies receive data and/or imagery, such as weather data and Doppler radar inputs, and create a video segment from the data or imagery. The Screenies convert the input data and/or imagery into video segments that conform to a predetermined format. For example, a Screenie can convert weather data into a video segment that includes a weather provider logo at the upper left of the screen and provides information and graphics representing current conditions in the middle left of the screen.

The video server 50 creates a video program by populating a linear frame buffer 76 with the video segments produced by the encoders and/or Screenies. As used herein the term "linear frame buffer" includes a sequential series of video frames and associated synchronized audio tracks. Once a sufficient amount of information is buffered in the linear frame buffer, the information is encoded using an appropriate encoding scheme by an encoder, collectively 82. FIG. 4 illustrates three exemplary encoders, a Real Networks encoder 82a, an Apple QuickTime encoder 82b, and a Microsoft Windows Media Format encoder 82c. Other formats are also supported including, but not limited to, MPEG2, MPEG4 and 3GPP. As will be apparent to those skilled in the art additional and/or alternative encoders can also be used. The video server is not limited to outputting a video program. The video server can also output a dynamic audio file or broadcast, a video slideshow or an MMS (MultiMedia Messaging Service) message.

Although not shown in FIG. 4, the audio for the video program is assembled in a similar manner as the video. The Screenies typically produce only video content so the audio for the video segments created by the Screenies is obtained from the audio system or from another source of audio. The audio system includes pre-recorded text by the OCMs, music or any other type of sound effect or audio. In one embodiment, the pre-recorded text by the OCMs includes pre-recordings of each OCM describing all of the possible values for the various pieces of a weather forecast, such as temperature, wind speed, cloud cover, precipitation, etc.

A script controls the creation of a video program by the video server. In one embodiment, the script uses SMIL (Synchronized Multimedia Integration Language). SMIL is a W3C standard XML-based language for the sequencing of audio, video, graphic and text information. The script is created by the video server in response to receiving a request from an end user device. The request includes a number of parameters that define the video program. For example, the request specifies an encoding scheme, a video screen size and a transition bit rate. In addition, the request includes a geographic identifier, such as a DMA, that identifies the location of the device associated with the request.

As an example, an end viewer living in Marietta, Ga. selects a local weather program. In response, the device associated with the end viewer requests a video program from the video server. The request includes parameters that define the content for a local weather video, such as a geographic identifier, as well as an indication for a local weather program. The video server creates a script using a predefined "local weather" script. The predefined script defines the types of information to be included in the local weather video program. Exemplary components for a local weather video include a location-based OCM video introduction, a current conditions segment, a forecast segment, a Doppler radar segment, a seasonal vertical content segment, and a location-based OCM video closing. The seasonal vertical content segment includes seasonal information related to interests, lifestyles, health and/or safety. Examples of seasonal vertical content segments include segments providing information relevant to recreation or lifestyle, such as golfing or skiing, information about seasonal health conditions, such as pollen or air quality, and information about seasonal weather conditions, such as hurricanes or ice storms.

In this example, the video server determines that Marietta, Ga. is associated with the Atlanta DMA and retrieves the appropriate Atlanta OCM segments. The video server via its Screenies also obtains the current conditions, forecast and Doppler radar data for Marietta, Ga. and associates appropriate audio from the audio system to create video segments that provide the current local conditions, the current local forecast, and the current Doppler radar.

Figure 5:
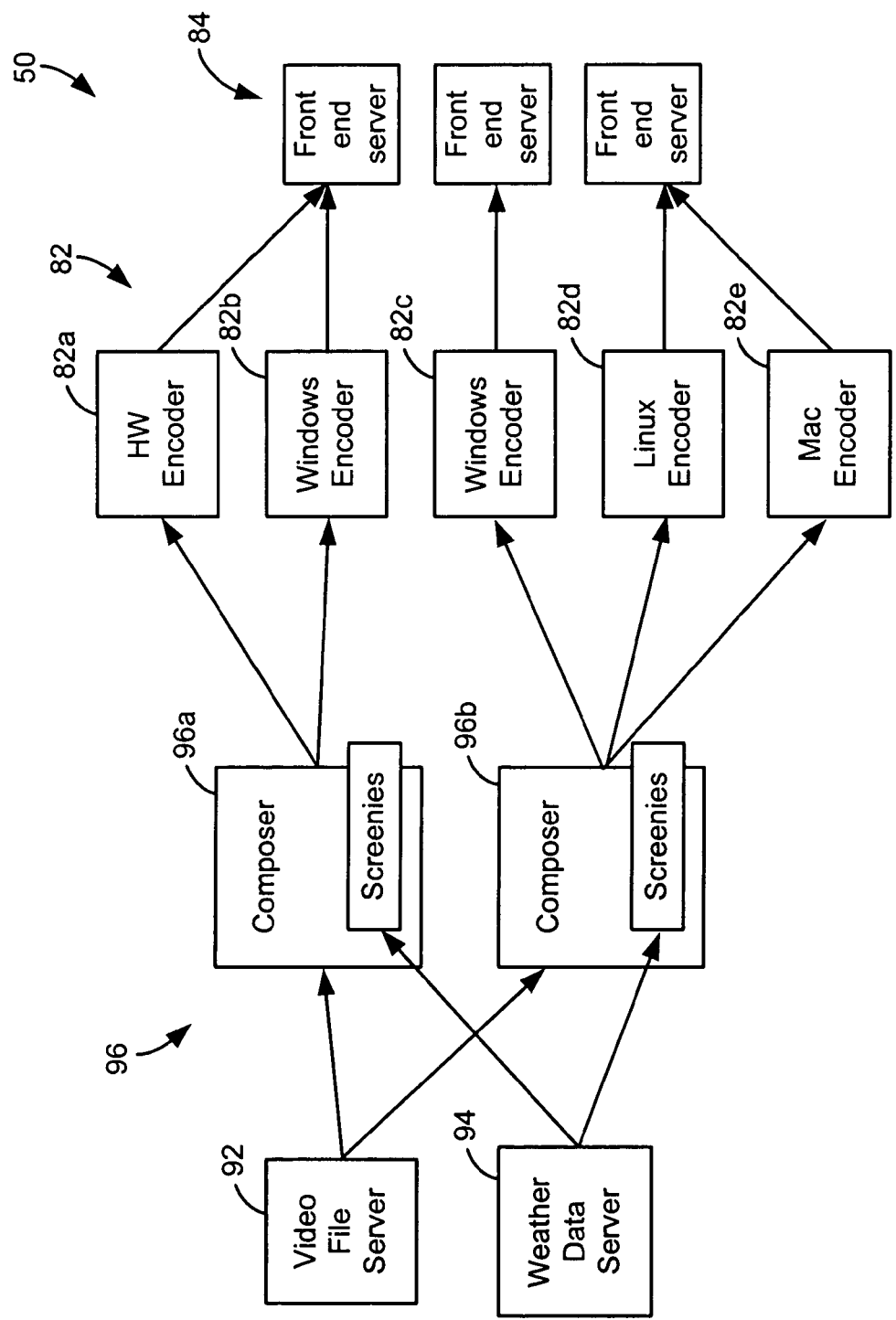
FIG. 5 is another block diagram of the exemplary video server.

FIG. 5 illustrates the Composer applications, collectively 96, that execute the scripts. A Composer controls the Screenies and the encoders and builds the linear frame buffer according to the script. The Composer expands source video from the decoders and Screenies to individual frames in the linear frame buffer and controls the coordination of audio and video. FIG. 5 illustrates one embodiment in which a single Composer, such as Composer 96a, controls multiple encoders, such as encoders 82a and 82b. However, in other embodiments multiple Composers interface with a single encoder. The use of multiple encoders allows the video server to support a number of different encoding schemes. Typically, the encoders include different vendor or Open Source video encoders, possibly running on different machines under different operating systems.

FIG. 5 illustrates a hardware encoder 98a, Microsoft Windows Media Format encoders 98b, 98c, a Linux encoder 98d and an Apple QuickTime encoder 98e. The encoders may run on different machines due to the compute intensive nature of encoding. Once the appropriate encoder has encoded the video program or a portion of the video program, the encoder provides the video program to the appropriate front-end server. The front-end servers are responsible for handling the end viewer device connections, as well as securing the video server from the rest of the network.

The video server is capable of creating many video programs for different users simultaneously. For example, the video server may receive multiple requests from different end viewers in different locations for local weather video programs. The number of simultaneous requests that can be handled by the video server is determined by the configuration of the video server. Typically, a given set of hardware will have an associated capacity measured in bytes per second. The capacity needed to satisfy the received requests depends upon the video size and the stream bit rate associated with the requests. For example, a given set of hardware may be able to provide ten "small" video programs, four "medium" video programs or one "large" video program simultaneously since the required capacity is essentially the same. To increase the capacity of the system, the system is scaled by adding additional hardware. As shown in FIG. 5, the system can be scaled by adding additional components at various levels, such as by adding additional systems running the composer applications, adding additional systems running the encoders and/or adding additional front-end servers. In a system that is composed of multiple systems/components, the requests are assigned to a particular system based upon the available capacity of the various systems/components. Typically, the system is configured to serve a target capacity.

Video Programs

Figure 6:
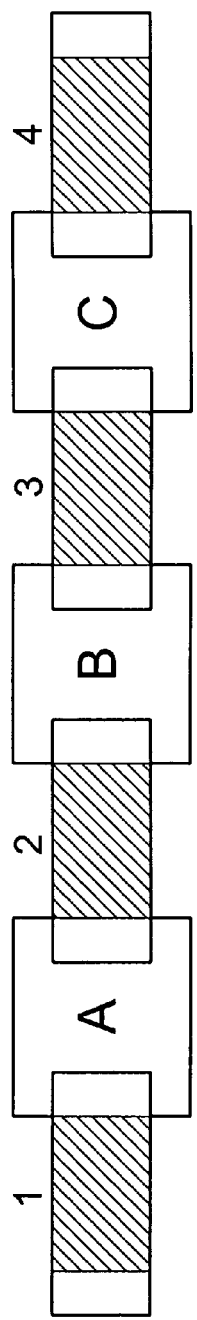
FIG. 6 is a diagram depicting the assembly of video segments into a video program, in accordance with an embodiment of the invention.

FIG. 6 illustrates the assembly of video segments into a video program. A number of video segments are shown in FIG. 6 as numbered rectangles "1", "2", "3" and "4". The video segments can be connected in various ways to support the various requests for video programs. One video program may include the video segments arranged as shown in FIG. 6, whereas another video program may include video segments "1", "2", "5" (not shown) and "6" (not shown).

The video server is capable of creating many video programs for different users simultaneously. However, to optimize the creation of the video programs, the video server can store certain video segments or portions of video segments in anticipation that the stored video will be reused. The shaded portions of the rectangles shown in FIG. 6 represent the portions of the video segments stored by the video server. These portions can be reused provided that the subsequent request specifies the same parameters as the initial request and that the content of the segments is still current. In one embodiment, the stored video segments or portions of video segments are encoded so that they can be reused without having to be re-encoded.

The unshaded portions of the rectangles represent the portions of the video segments that are not stored. Typically, the unshaded portion represent the portions of the video segment that are used in fading and transitioning from one video segment to another video segment. The fading and transition frames are represented by the lettered squares, "A", "B", and "C". If the stored video segments or portions of video segments are encoded, then only the material in the unshaded portions need to be encoded for a subsequent request that uses the same video segment.

Figure 7:
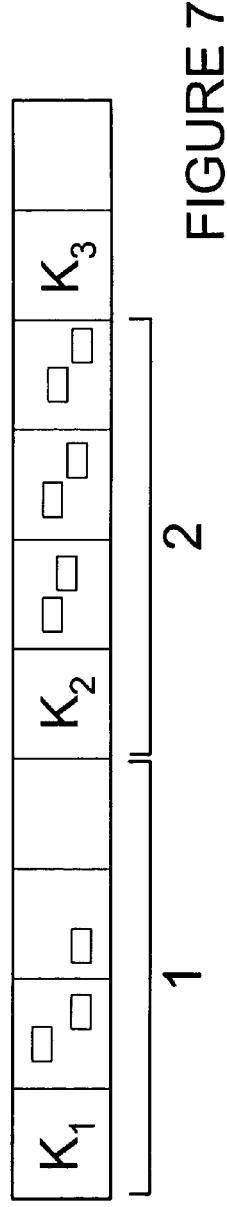
FIG. 7 is a diagram illustrating video segments, in accordance with an embodiment of the invention.

FIG. 7 illustrates frames within an exemplary video program. The frames are grouped into different video portions, as indicated by the numerals "1" and "2" which correspond to video segments "1" and "2" in FIG. 6. Each video portion begins with a key frame, indicated by "$K_n$". The key frame includes all of the information needed to create a complete screen image. The frames following the key frames are differential frames that only include the information that differs from the preceding frame. The rectangles illustrated in FIG. 7 illustrate areas of the screen that contain information that differs from the previous frame. The number and/or frequency of key frames are selected so that in the event of a transmission problem, the interruption of the video program is minimized for the end viewer. The location of the key frames also affects the storage of video segments or portions of video segments. For example, the portions of the video segments shown as "A", "B" and "C" in FIG. 6 each begin with a new key frame.

Figure 8:
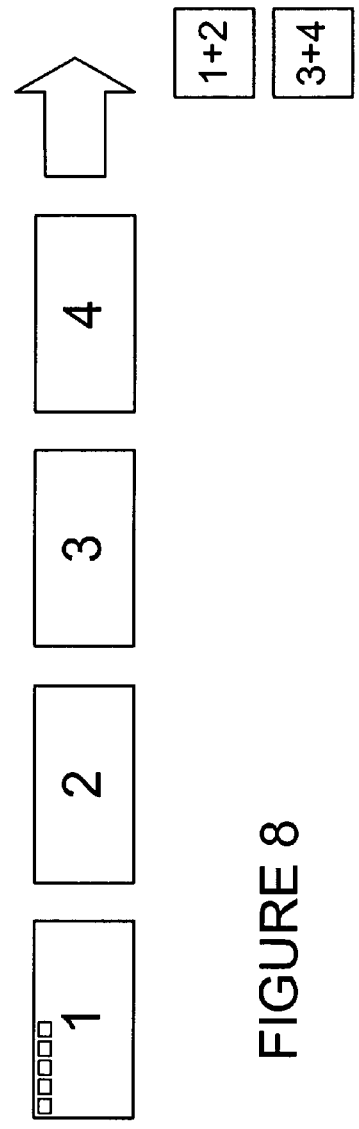
FIG. 8 is a diagram illustrating the storage of portions of a video program, in accordance with an embodiment of the invention.

FIG. 8 further illustrates the storage of portions of a video program. The video segments, such as the video segment numbered "1" include a number of frames. The frames are illustrated by the small rectangles within the video segment. A portion of a video program includes multiple video segments and can be stored as shown in FIG. 8. FIG. 8 illustrates that video segments "1" and "2" are stored together and that video segments "3" and "4" are stored together.

The forgoing description of the preferred embodiments of the invention has been presented only for the purpose of illustration and description and is not intended to be exhaustive or to limit the invention to the precise foams disclosed. Many modifications and variations are possible in light of the above teaching. For instance, the video server is not limited to creating video programs directed to the weather, but can be used to create video programs directed to any type of perishable information. The embodiments were chosen and described in order to explain the principles of the invention and their practical application so as to enable others skilled in the art to utilize the invention and various embodiments and with various modifications as are suited to the particular use contemplated.

What is claimed is:

1. A system for creating a video program comprising:
a video server that executes a script created in response to receiving a request, the script defining the sequencing of audio and video segments associated with the request;
a plurality of decoders supporting a plurality of encoding schemes, wherein a first decoder receives a first video input of recorded live video content and decodes the first video input to create a first video segment that includes a selected speaker;
a plurality of converters, wherein a first converter receives a data input that includes data related to a plurality of conditions and creates a new video segment having new content based on selected data that corresponds to a selected condition;
a linear frame buffer for assembling frames from the first video segment and frames from the new video segment to create the video program, wherein the frames from the new video segment correspond to the selected condition and wherein the selected condition is received from a remote device via a network;
a plurality of encoders for receiving the video program from the linear frame buffer and encoding the video program; and
an audio database that stores a plurality of audio recordings, each audio recording corresponding to a particular condition and a particular speaker,
wherein the system, in accordance with the script, creates a new audio segment that includes at least one of the audio recordings that corresponds to the selected condition and the selected speaker and synchronizes the new audio segment to the new video segment.

2. The system of claim 1, further comprising a video database for storing the new video segment.

3. The system of claim 1, wherein the first decoder receives the first video input from a database.

4. The system of claim 1, wherein the first decoder receives the first video input in real-time.

5. A method for creating a video program, wherein the video program comprises a plurality of video segments and a plurality of audio segments, comprising:

providing a plurality of audio recordings, wherein each audio recording corresponds to a particular condition and a particular speaker;

receiving a recently recorded live video segment and a recently recorded audio segment associated with the recently recorded live video segment, the recently recorded live video segment and the recently recorded audio segment featuring a selected speaker;

receiving data related to a plurality of conditions; and receiving a request for the video program from a remote device via a network, wherein the request specifies a selected condition; and in response to receiving the request, creating a script based on the request and the selected condition that defines the types of information to be included in the video program, and in accordance with the script:

using at least the data related to the selected condition to create a new video segment having new content;

using at least one of the audio recordings that corresponds to the selected condition and the selected speaker to create a new audio segment;

associating the new audio segment with the new video segment; and combining the recently recorded live video segment and the recently recorded audio segment with the new video segment and the new audio segment to create the video program.

6. The method of claim 5, wherein the recently recorded video segment and the recently recorded audio segment include content directed to a time and a location.

7. The method of claim 5, wherein the video program is transmitted to the remote device via the network.

8. The method of claim 5, wherein the request for the video program includes an encoding parameter, further comprising: encoding the video program using an encoding scheme that corresponds to the encoding parameter.

9. The method of claim 5, wherein the request for the video program includes a location parameter, and wherein the data is related to a location that corresponds to the location parameter.

10. The method of claim 5, wherein the recently recorded video segment is encoded, further comprising:

decoding the recently recorded video segment prior to combining the recently recorded video segment and the recently recorded audio segment with the new video segment and the new audio segment.

11. The method of claim 5, wherein the selected condition corresponds to a weather condition.

12. A method for creating a plurality of distinct video programs, comprising:

receiving a plurality of requests from a plurality of remote devices via a network for the distinct video programs, wherein each request specifies a condition;

for each of the requests, creating the requested video program by creating a script based on the request and the condition that defines the types of information to be included in the requested video program, and based on the script:

selecting a recently recorded live video segment and a recently recorded audio segment associated with the recently recorded live video segment that is relevant to the request, wherein the recently recorded live video segment and the recently recorded audio segment both feature a selected speaker;

receiving data that is relevant to the condition specified by the request;

using the data relevant to the condition specified to create a new video segment having new content;

selecting one or more audio recordings that correspond to the selected speaker and to the received data;

using the selected one or more audio recordings to create a new audio segment;

associating the new audio segment with the new video segment; and combining the recently recorded live video segment and the recently recorded audio segment with the new video segment and the new audio segment to create the requested video program; and delivering the requested video programs to the remote devices.

13. The method of claim 12, wherein the condition corresponds to a weather condition.

14. The method of claim 12, wherein the recently recorded video segment corresponds to a particular time period.

15. The method of claim 12, wherein at least one of the requests for the video programs includes a location parameter, and wherein the data is related to a location that corresponds to the location parameter.

16. The method of claim 12, wherein each request is associated with a different requestor and wherein delivering the requested video programs comprises delivering each of the requested video programs to the associated requestor.

17. The method of claim 16, wherein the requestor is an end user.

18. The method of claim 16, wherein the requestor is a server.

19. The method of claim 12, further comprising storing the new video segment.

20. The method of claim 12, wherein the data is non-video data.

21. The method of claim 12, further comprising:

receiving an encoded video segment;

decoding the encoded video segment to obtain one of the live recently recorded video segments; and encoding at least one of the requested video programs prior to delivering the at least one requested video program, wherein the decoding scheme used to decode the encoded video segment is independent of the encoding scheme use to encode the at least one requested video program.

* * * * *